April 29, 1924.
D. DILEO
GAS SAVING DEVICE
Filed Nov. 7, 1921
1,492,433
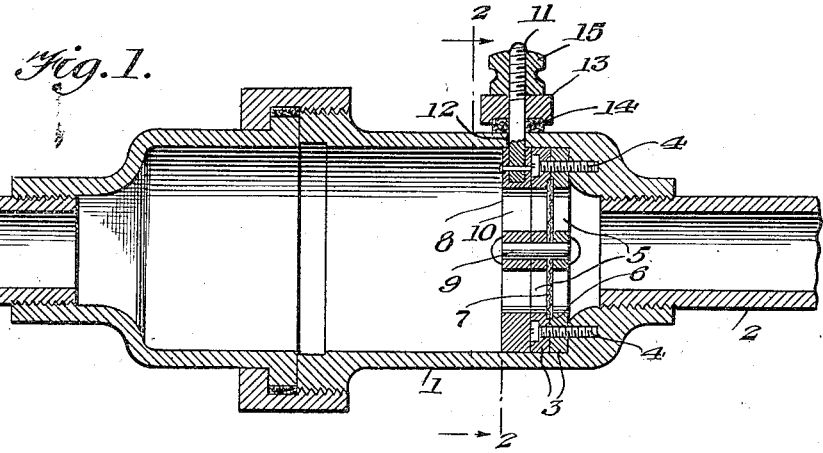
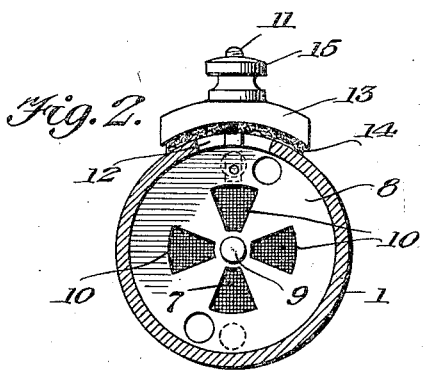
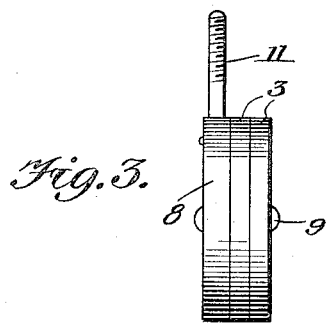
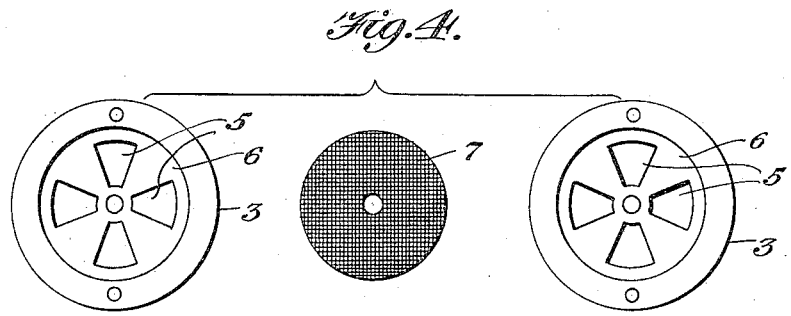
Dominick Dileo,
INVENTOR
BY Victor J. Evans
ATTORNEY
WITNESS:
J. M. Evans Patented Apr. 29, 1924.

1,492,433

UNITED STATES PATENT OFFICE.

DOMINICK DILEO, OF UTICA, NEW YORK.

GAS-SAVING DEVICE.

Application filed November 7, 1921. Serial No. 513,577.

*To all whom it may concern:*

Be it known that I, DOMINICK DILEO, a citizen of the United States, residing at Utica, in the county of Oneida and State of New York, have invented new and useful Improvements in Gas-Saving Devices, of which the following is a specification.

This invention relates to a pressure reducing device for use in gas lines and the like, the principal object of the invention being to provide means for regulating the pressure and thus reducing waste resulting from excessive pressures.

Another object of the invention is to provide a strainer which is associated with the device and acts to strain fluid passing through the same.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a longitudinal sectional view showing my invention placed in a conduit.

Figure 2 is a section on line 2—2 of Figure 1.

Figures 3 and 4 are detail views.

In these views 1 indicates a coupling having restricted ends and forming part of the conduit 2 through which the fluid under pressure passes. In carrying out the invention I place a pair of plates 3 in superimposed relation adjacent one restricted end of the coupling, the plates being secured thereto by the bolts 4 which are threadedly embedded in this restricted portion as shown in Figure 1 of the drawings. The plates are provided with openings 5 for the passage of the fluid and the abutting faces of the plates are recessed centrally, as at 6, to receive a straining medium 7. A disc 8 is pivotally secured to the plates by means of the pivot pin 9, said disc having openings 10 therein and said disc is provided with a stem 11 which passes through a slot 12 in the coupling, said slot being made long enough to permit the disc to be moved to place the openings therein in register with the openings in the plate or to move said openings out of register to check the flow of fluid through the conduit. The slot 12 is closed by a cap 13 and a gasket 14, the parts being firmly held in contact with the coupling by means of the nut 15 engaging the screw threaded outer end of the stem 11.

It will thus be seen that by adjusting the disc 8 upon the plates the sizes of the openings can be adjusted to control the flow of fluid through the conduit and thus the pressure of the fluid can be regulated. This will save waste as by reducing the pressure of gas for instance, at the burners, a less quantity of gas will be consumed.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

The combination with a conduit, of a coupling having restricted ends and forming a part of the conduit, a pair of plates arranged in super-imposed relation and being provided with aligned openings, bolts passing through diametrically opposite sides of the plates and securing them against the side walls of one of the restricted end portions for controlling the opening therein, a straining medium sandwiched between the plates, a disk having openings associated with some of the openings of the plate, a stem passing through one of the aligned openings of the plate and opening in the disk for pivotally associating the disk with the plates, said coupling having a slot arranged in its top wall, a gasket seated elongated cap closing the slot, a stem rising from the disk and extending through the slot for reciprocation therein and a nut engaging the extended end of the stem and normally bearing against the cap for the purpose specified.

In testimony whereof I affix my signature.

DOMINICK DILEO.